US012643396B1

(12) United States Patent
Ryu et al.

(10) Patent No.: US 12,643,396 B1
(45) Date of Patent: Jun. 2, 2026

(54) BUILT-IN DISCONNECTOR ASSEMBLY FOR ELECTRONIC LIMITED SLIP DIFFERENTIAL DEVICE

(71) Applicants: HYUNDAI MOTOR COMPANY, Seoul (KR); KIA CORPORATION, Seoul (KR)

(72) Inventors: Young-Bae Ryu, Hwaseong-si (KR); Sang-Bum Baek, Hwaseong-si (KR); Jin-Seung Lim, Hwaseong-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 0 days.

(21) Appl. No.: 19/188,698

(22) Filed: Apr. 24, 2025

(30) Foreign Application Priority Data

Dec. 2, 2024 (KR) ......................... 10-2024-0176625

(51) Int. Cl.
*B60K 17/02* (2006.01)
*B60K 17/16* (2006.01)
*F16H 48/34* (2012.01)

(52) U.S. Cl.
CPC ............ *B60K 17/02* (2013.01); *B60K 17/165* (2013.01); *F16H 48/34* (2013.01); *F16H 2048/343* (2013.01)

(58) Field of Classification Search
CPC ............................ F16D 2023/123; F16D 13/52
See application file for complete search history.

(56) References Cited

U.S. PATENT DOCUMENTS

| | | | | |
|---|---|---|---|---|
| 4,950,214 A * | 8/1990 | Botterill | ................ | F16H 48/295 |
| | | | | 475/231 |
| 5,279,401 A * | 1/1994 | Stall | .................... | F16H 63/3026 |
| | | | | 192/52.4 |
| 6,827,663 B2 * | 12/2004 | Tucker-Peake | ......... | F16H 48/34 |
| | | | | 475/233 |
| 7,357,748 B2 * | 4/2008 | Kelley, Jr. | ............. | F16H 48/295 |
| | | | | 192/93 A |
| 11,118,664 B2 * | 9/2021 | Zink | ........................ | F16D 23/12 |
| 2020/0141476 A1 * | 5/2020 | Zink | ........................ | F16D 13/52 |

FOREIGN PATENT DOCUMENTS

KR          2023-0025175 A          2/2023

* cited by examiner

*Primary Examiner* — Stacey A Fluhart
(74) *Attorney, Agent, or Firm* — MCDONNELL BOEHNEN HULBERT & BERGHOFF LLP

(57) ABSTRACT

A built-in disconnector assembly for an electronic limited slip differential device includes a shift guide sliding so that an outer case and an inner case of a disconnector device are fastened, a piston pressing a multi-plate clutch of the electronic limited slip differential (eLSD) device so that the multi-plate clutch enters an operation state, and a ball ramp operation unit rotated by a driving motor and sliding the shift guide and the piston toward the disconnector device, in which the ball ramp operation unit slides the shift guide to fasten the disconnector device and then is additionally rotated at a predetermined angle to slide the piston so that the eLSD device enters a fastened state.

18 Claims, 14 Drawing Sheets

BUILT-IN DISCONNECTOR ASSEMBLY FOR ELECTRONIC LIMITED SLIP DIFFERENTIAL DEVICE

CROSS REFERENCE TO RELATED APPLICATIONS

This application claims priority to Korean Patent Application No. 10-2024-0176625, filed on Dec. 2, 2024, which is incorporated herein by reference in its entirety.

BACKGROUND

Field of the Disclosure

The present disclosure relates to a built-in disconnector assembly for an electronic limited slip differential (eLSD) device, which may sequentially operate a disconnector device and eLSD device for a vehicle using one actuator.

Description of Related Art

Since four-wheel drive electric vehicles experience drag loss in a non-driven wheel when two wheels are driven or during coasting traveling, a disconnector device for mechanically blocking connection between the non-driven wheel and a motor and a reducer is provided.

The disconnector device allows an electric vehicle to selectively travel using four wheels and two wheels to reduce no-load drag loss.

In addition, a separate electronic limited slip differential (eLSD) device is installed to improve the traveling performance of the vehicle and compensate for the loss of a driving force due to wheel slip, etc. When the eLSD device is provided, handling performance and starting performance are improved.

Both the disconnector device and the eLSD device need to be provided in the vehicle, which increases the production cost and weight of the vehicle.

In particular, when the disconnector device and the eLSD device are installed inside the vehicle, a large amount of space, such as a space in which the disconnector device and the eLSD device are installed and a space in which an actuator for operating the disconnector device and the eLSD device is installed, is required. Since the actuator is mounted outside the reducer, the actuator needs to have little space for mounting, and application of an actuator (e.g., a hydraulic actuator or a dedicated motor for an eLSD device) for operating a wet multi-plate clutch of the above eLSD device is ideal. However, since the actuator is installed outside the disconnector or the eLSD device, a large amount of space is inevitably needed to install the actuator.

SUMMARY

The present disclosure is provided to solve the above problems and is directed to providing a built-in disconnector assembly for an electronic limited slip differential (eLSD) device, in which it is possible to minimize a space required for installation and operation by sequentially operating a disconnector device and the eLSD using one driving motor.

To achieve the above object, a built-in disconnector assembly for an electronic limited slip differential (eLSD) device according to the present disclosure includes a shift guide formed to slide so that an outer case and an inner case of a disconnector device are fastened, a piston formed to press a multi-plate clutch so that the multi-plate clutch of the eLSD device enters a fastened state, and a ball ramp operation unit rotated by a driving motor to slide the shift guide and the piston toward the disconnector device, wherein the ball ramp operation unit slides the shift guide to fasten the disconnector device, and then additionally rotates at a predetermined angle to slide the piston so that the eLSD device enters a fastened state.

The built-in disconnector assembly further includes a sleeve slid by the shift guide, and a clutch ring which is formed integrally with the sleeve, in which a spline is formed along a circumference thereof, and which rotates integrally with the outer case, wherein, when the sleeve and the clutch ring move toward the inner case, the outer case and the inner case are fastened.

Another spline engaged with the spline of the clutch ring is formed on the inner case, and the clutch ring is engaged with the inner case so that the inner case and the outer case are engaged.

A guide accommodation groove is formed at a predetermined depth along a circumference of the sleeve, and a coupling portion inserted into the guide accommodation groove is formed on an inner surface of the shift guide.

The ball ramp operation unit includes the driving motor, a fixed ramp rotated by the driving motor to slide the shift guide, a movable ramp slid by the rotation of the fixed ramp and formed to slide the piston, and a ball disposed between the fixed ramp and the movable ramp and formed to push the movable ramp by the rotation of the fixed ramp.

A slot having a profile is formed along a circumference of the shift guide.

The slot of the shift guide includes a first rotation section which is formed at a predetermined angle in a circumferential direction of the shift guide and fastens the outer case and the inner case from a separated state, an inclined section connected to the first rotation section, and a second rotation section which is connected to the inclined section, formed in the circumferential direction of the shift guide to be positioned closer to the fixed ramp than the first rotation section, and in which the multi-plate clutch is pressed.

While the finger of the fixed ramp rotates in the second rotation section, the fixed ramp pushes the movable ramp to press the multi-plate clutch.

The fixed ramp has an extension extending toward the shift guide, and a finger formed on an end portion of the extension and inserted into the slot.

A driven gear unit is formed at a predetermined angle in the circumferential direction of the fixed ramp on the circumference of the fixed ramp, and the driven gear unit is engaged with a driving gear unit provided on the output shaft of the driving motor.

A ball accommodation groove formed to accommodate the ball is formed in a surface of the fixed ramp, which faces the movable ramp, along the circumference of the fixed ramp, and another ball accommodation groove formed to accommodate the ball is formed in a surface of the movable ramp, which faces the fixed ramp, along the circumference of the movable ramp.

When the fixed ramp rotates and the ball is detached from one of two adjacent ball accommodation grooves, the movable ramp is pushed toward the multi-plate clutch so that the piston presses the multi-plate clutch.

A first connection portion protruding toward the clutch ring is formed on the sleeve along a circumference of the sleeve, a second connection portion protruding toward the sleeve is formed on the clutch ring along a circumference of the clutch ring, and the first connection portion and the second connection portion are fastened.

A through hole through which the first connection portion and the second connection portion are fastened after passing is formed in the outer case, and the outer case rotates integrally with the sleeve and the clutch ring.

According to the built-in disconnector assembly for an eLSD device of the present disclosure having the above configuration, as the clutch ring is inserted into the inner case, the inner case and the clutch ring are fastened by the spline so that the disconnector device is fastened, and thus the total length and the outer diameter of the disconnector device are reduced.

In addition, as the moving direction of the clutch ring is set to be same as the moving direction of the piston, the total length of the disconnector device is further reduced.

In addition, since the eLSD device is fastened at a time interval after the disconnector device is fastened by the profile of the shift guide, the disconnector device and the eLSD device do not interfere with each other during operation, thereby improving reliability.

DETAILED DESCRIPTION

Hereinafter, a built-in disconnector assembly for an electronic limited slip differential device according to the present disclosure will be described in detail with reference to the accompanying drawings.

Figure 1:
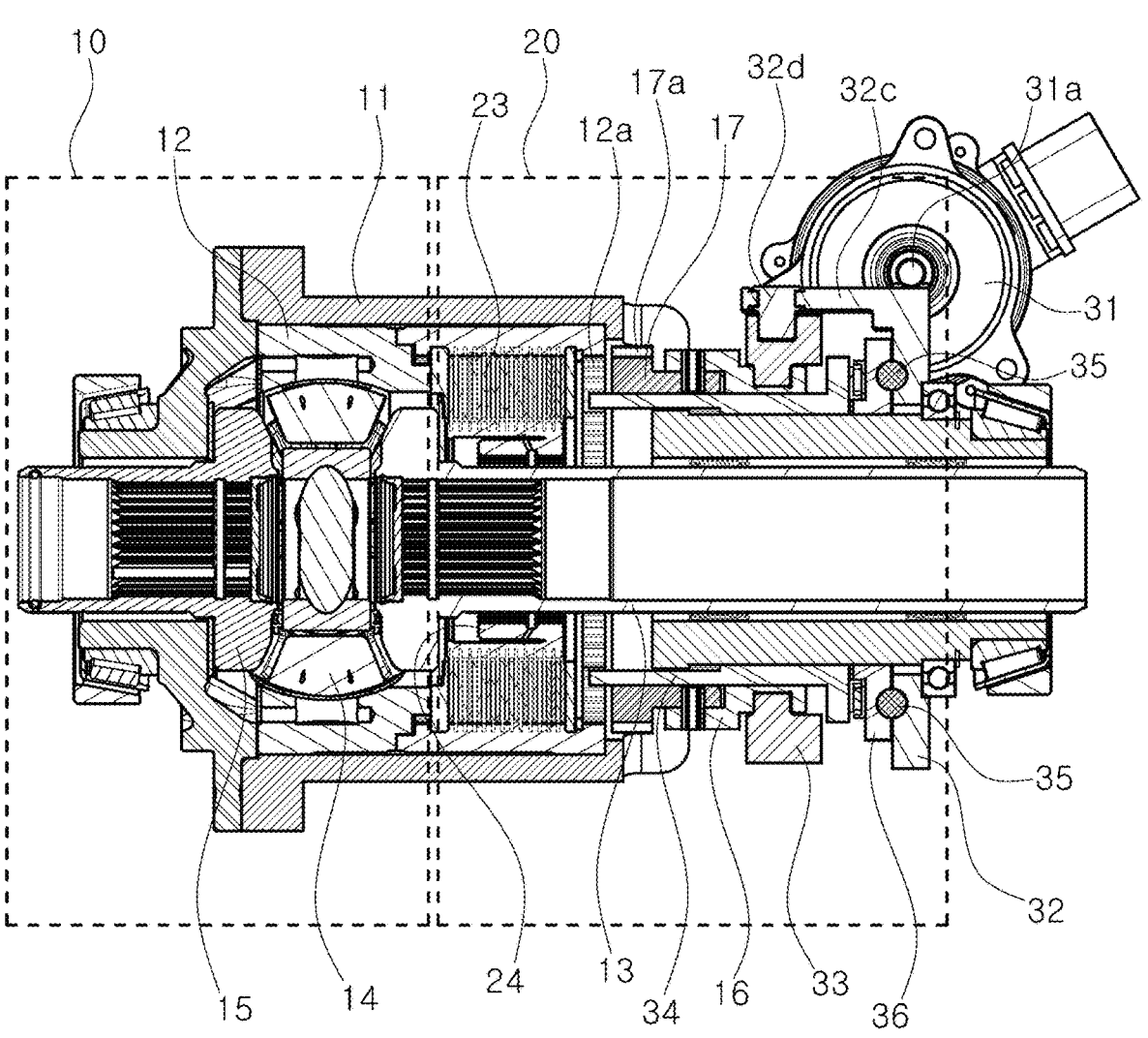
FIG. 1 is a cross-sectional view illustrating a built-in disconnector assembly for an electronic limited slip differential device according to the present disclosure.
Figure 2:
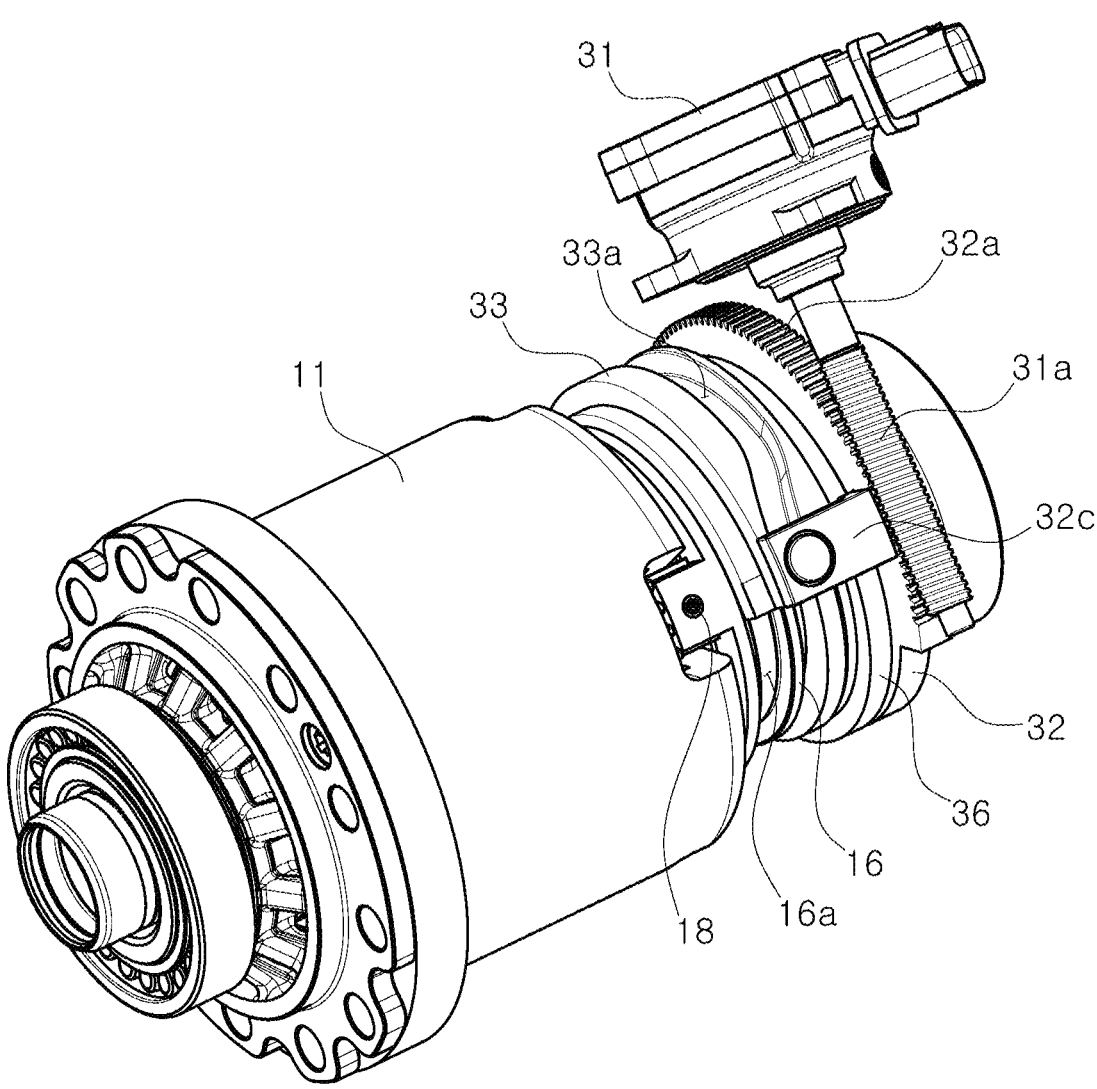
FIG. 2 is a perspective view illustrating the built-in disconnector assembly for an electronic limited slip differential device according to the present disclosure.
Figure 3:
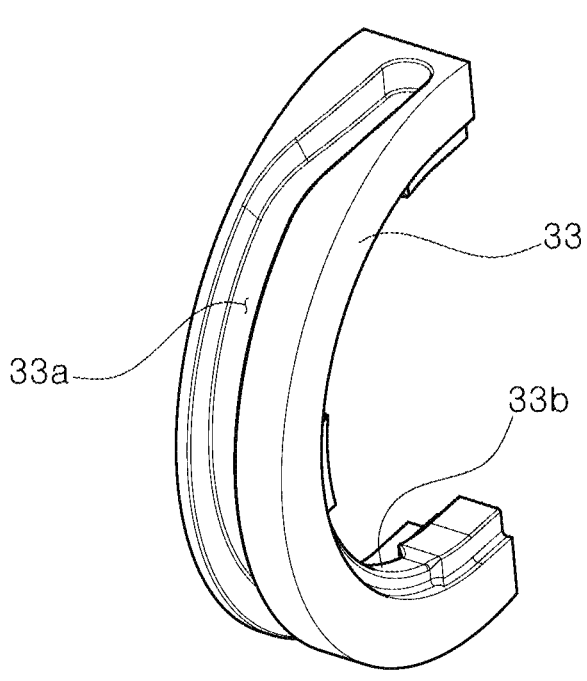
FIG. 3 is a perspective view illustrating a shift guide in the built-in disconnector assembly for an electronic limited slip differential device according to the present disclosure.

Referring to FIGS. 1 and 2, a built-in disconnector assembly for an electronic limited slip differential (eLSD) device according to the present disclosure includes a shift guide 33 sliding so that an outer case 11 and an inner case 12 of a disconnector device 10 are fastened, a piston 34 pressing a multi-plate clutch 23 of the electronic limited slip differential (eLSD) device 20 so that the multi-plate clutch 23 enters an operation state, and a ball ramp operation unit 30 rotated by a driving motor 31 and sliding the shift guide 33 and the piston 34 toward the disconnector device 10, in which the ball ramp operation unit 30 slides the shift guide 33 to fasten the disconnector device 10 and then is additionally rotated at a predetermined angle to slide the piston 34 so that the eLSD device 20 enters a fastened state.

The disconnector device 10 includes the outer case 11 into which a rotation force is input from the outside, the inner case 12 provided inside the outer case 11, and an output shaft 13 installed to pass through the outer case 11.

The disconnector device 10 has a pinion gear 15 installed on the output shaft 13 and a side gear 14 installed on the inner case 12, and the pinion gear 15 and the side gear 14 are engaged.

When the outer case 11 and the inner case 12 are not fastened, the rotation force input to the outer case 11 is not transmitted to the inner case 12, but when the outer case 11 and the inner case 12 are coupled, the rotation force input to the outer case 11 is output to the output shaft 13 through the inner case 12, the side gear 14, and the pinion gear 15.

The eLSD device 20 is connected to the output shaft 13, and the eLSD device 20 has the multi-plate clutch 23 installed therein to prevent the rotation force from being concentrated on one side of the output shaft 13 and not being transmitted to the other side in the disconnector device 10.

The eLSD device 20 includes the multi-plate clutch 23. The multi-plate clutch 23 includes plates disposed between disks, which are provided on a hub 24 at intervals, at intervals on an inner surface of the inner case 12. When the output shaft 13 is pressed in an axial direction, the disk is in contact with the plate, and thus the multi-plate clutch 23 enters an operation state, that is, a state in which power may be transmitted. The multi-plate clutch 23 in the operation state restricts the rotation of the output shaft 13 installed inside the eLSD device 20, the eLSD device 20 enters an fasten state. Accordingly, it is possible to prevent the rotation force from being transmitted to only one side in the disconnector device 10.

The outer case 11 and the inner case 12 are fastened to or separated by a sleeve 16 which slides in an axial direction of the output shaft 13.

Figure 7A:
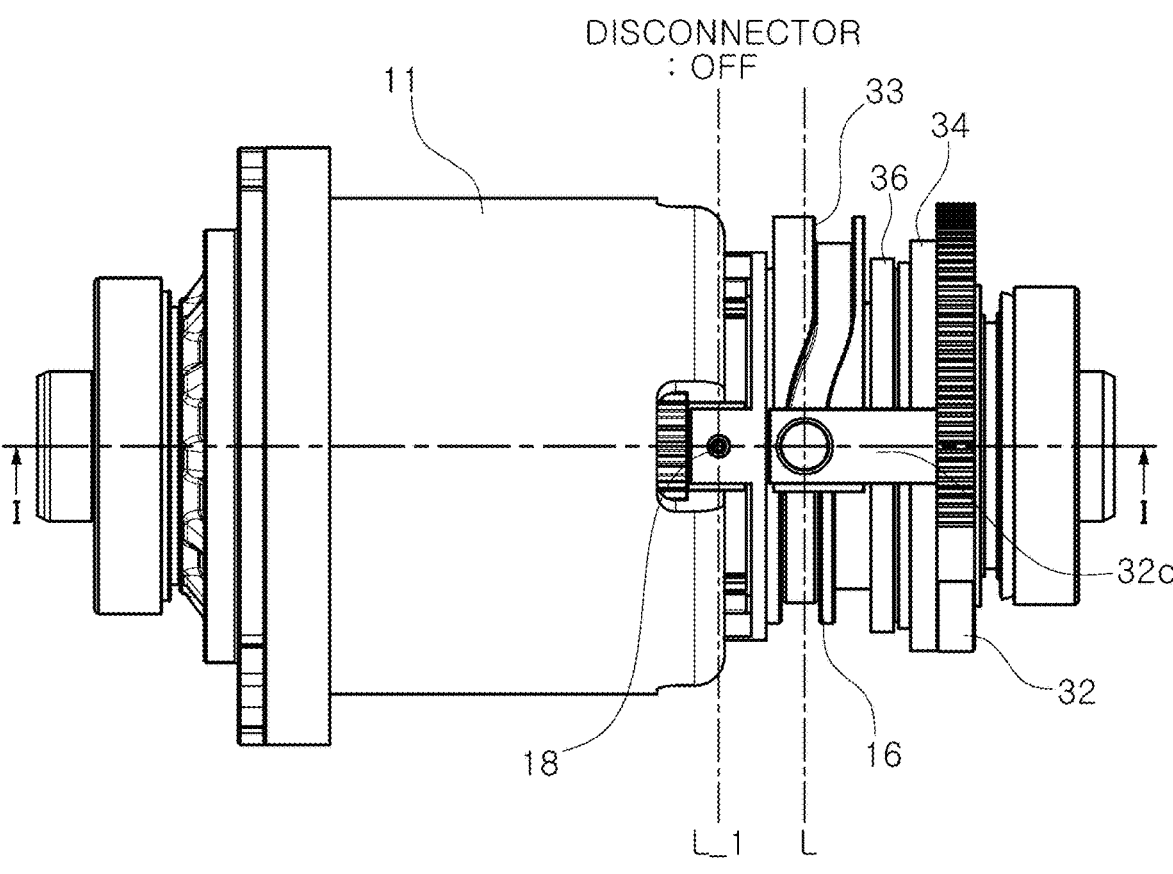
FIG. 7A is a side view illustrating a state in which both the disconnector device and the electronic limited slip differential device are not fastened in the built-in disconnector assembly for an electronic limited slip differential device according to the present disclosure.
Figure 7B:
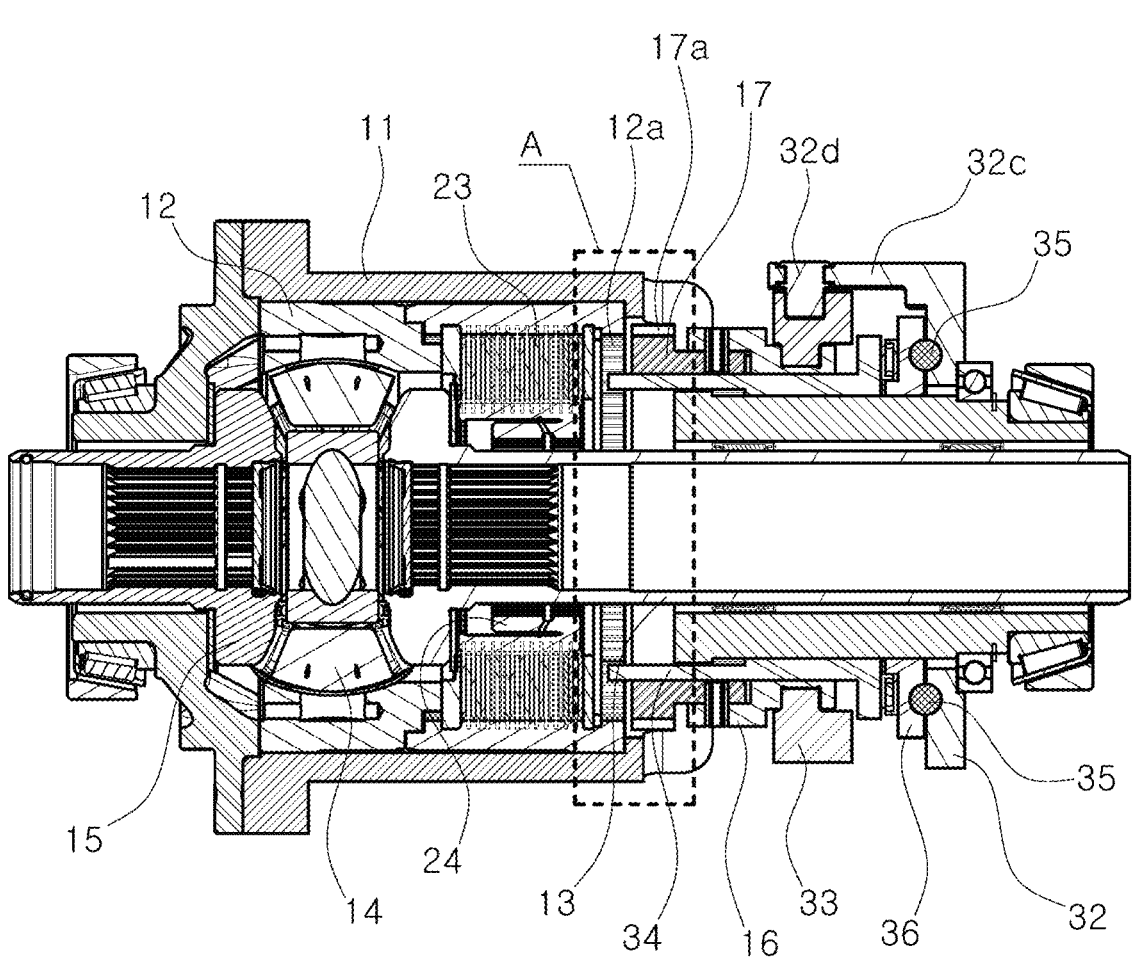
FIG. 7B is a cross-sectional view illustrating the state in which both the disconnector device and the electronic limited slip differential device are not fastened in the built-in disconnector assembly for an electronic limited slip differential device according to the present disclosure.

As shown in FIG. 7B, a first spline 12a is formed on the inner surface of the inner case 12.

When the sleeve 16 slides, the inner case 12 and the outer case 11 are connected, and the disconnector device 10 enters a fastened state.

Since the sleeve 16 is connected to the shift guide 33 sliding in the axial direction of the output shaft 13, when the shift guide 33 slides, the sleeve 16 also slides in the axial direction of the output shaft 13.

When the outer case 11 and the inner case 12 are fastened, the sleeve 16 fastens the outer case 11 and the inner case 12 by a clutch ring 17.

The clutch ring 17 has a second spline 17a formed around an outer surface thereof and engaged with the first spline 12a. When the clutch ring 17 is slid toward the inner case 12 by the sleeve 16, the second spline 17a is engaged with the first spline 12a so that the clutch ring 17 is fastened to the inner case 12.

In addition, the clutch ring 17 is fastened integrally with the sleeve 16, and the clutch ring 17 and the sleeve 16 are respectively disposed inside and outside the outer case 11 so that the clutch ring 17 and the sleeve 16 rotate integrally with the outer case 11.

Figure 4A:
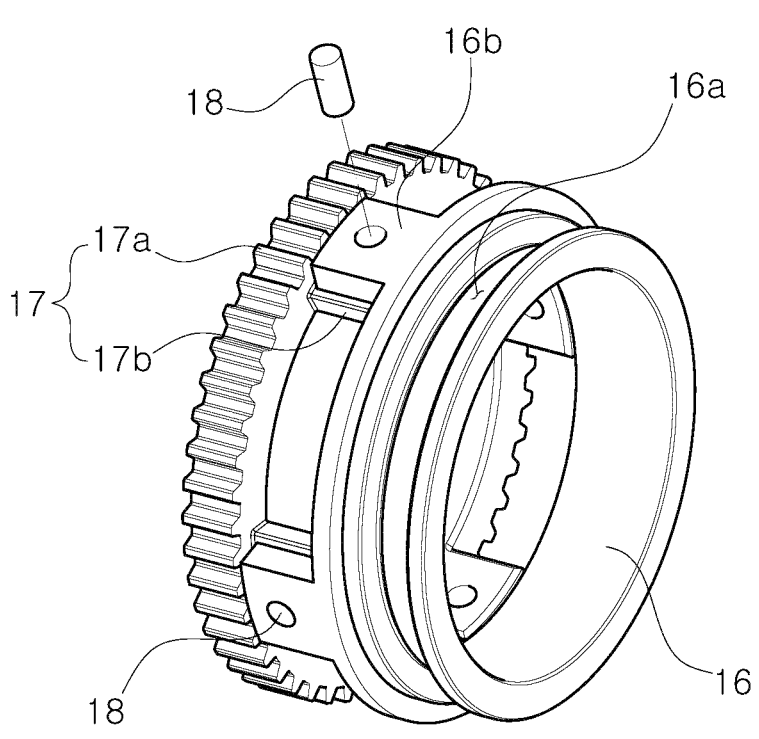
FIG. 4A is a perspective view illustrating a state in which a sleeve and a clutch ring are assembled in the built-in disconnector assembly for an electronic limited slip differential device according to the present disclosure.
Figure 4B:
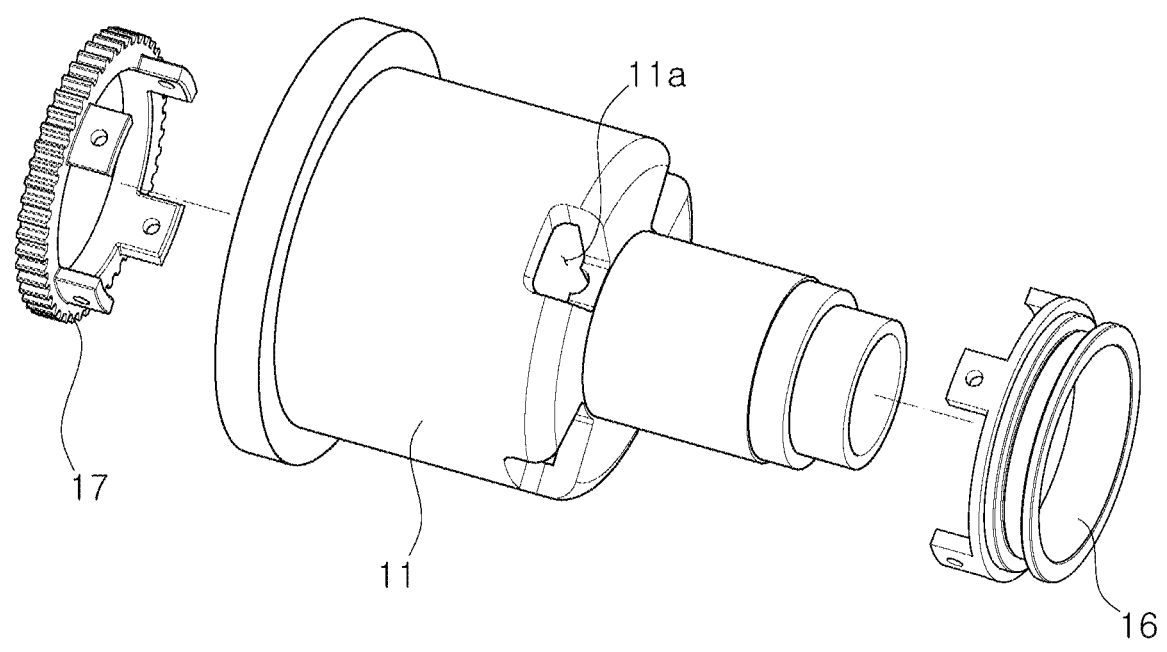
FIG. 4B is an exploded perspective view illustrating a state in which the sleeve and the clutch ring are assembled after passing through an outer case in the built-in disconnector assembly for an electronic limited slip differential device according to the present disclosure.

As shown in FIG. 4A, guide accommodation groove 16a and second spline 17a, which extend toward each other, are formed on the sleeve 16 and the clutch ring 17, respectively. Additionally, a first connection portion 16b of the sleeve 16, which protrudes toward the clutch ring 17, is formed along the circumference of the sleeve 16, and a second connection portion 17b of the clutch ring 17, which protrudes toward the sleeve 16, is formed along the circumference of the clutch ring 17.

The first connection portion 16b and the second connection portion 17b are fastened by a coupling pin 18 so that the clutch ring 17 and the sleeve 16 are integrated.

The clutch ring 17 is positioned inside the outer case 11, and the sleeve 16 is positioned outside the outer case 11, and a through hole 11a through which the first connection portion 16b and the second connection portion 17b pass is formed in the outer case 11. Accordingly, when the clutch ring 17 and the sleeve 16 rotate, the first connection portion 16b and the second connection portion 17b are caught on the through hole 11a, and the outer case 11 also rotates integrally.

The ball ramp operation unit 30 causes the clutch ring 17 to be engaged with the inner case 12 and causes the multi-plate clutch 23 to be operated.

Figure 5:
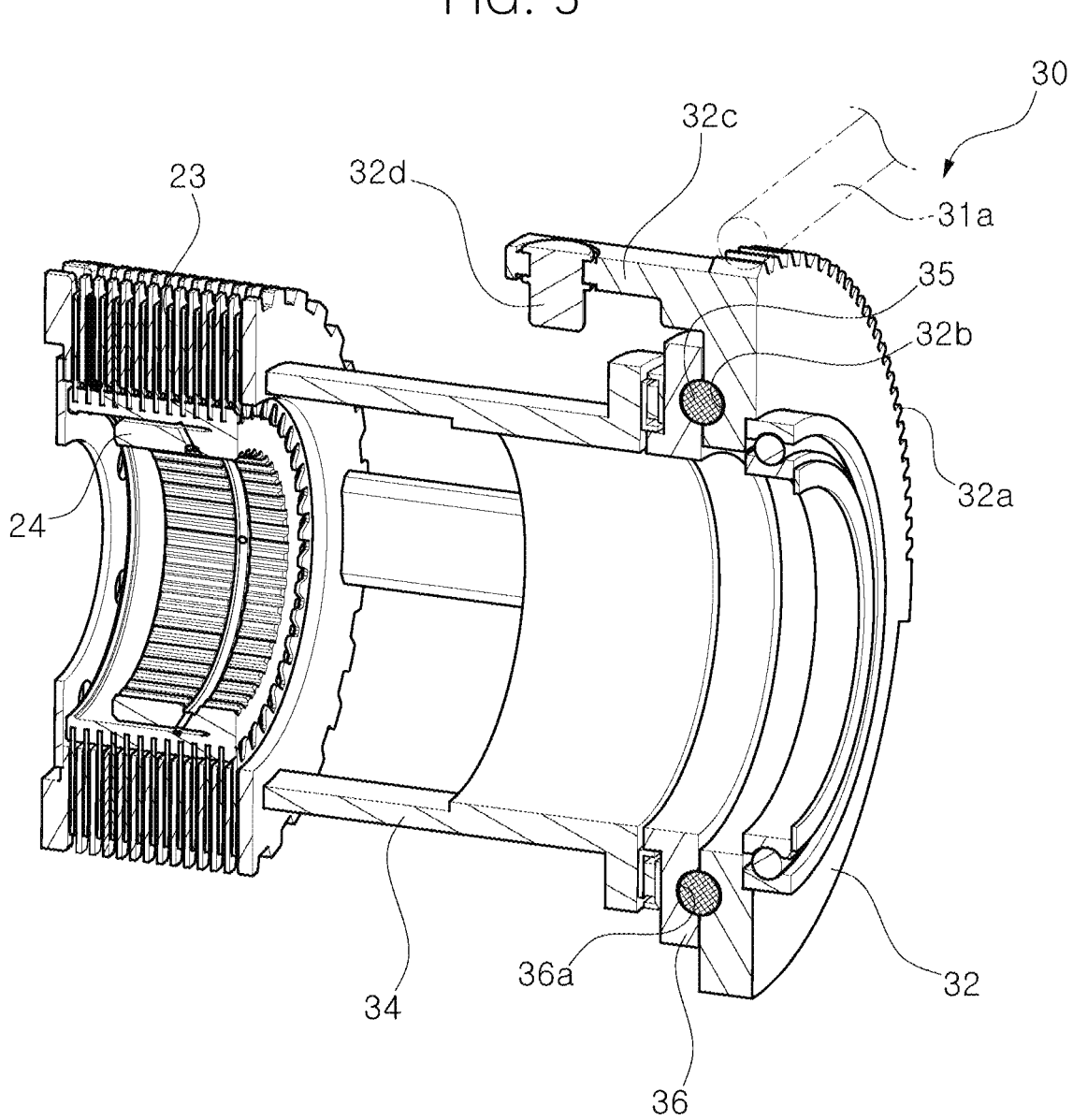
FIG. 5 is a perspective view illustrating an assembly of the sleeve and the clutch ring in the built-in disconnector assembly for an electronic limited slip differential device according to the present disclosure.

Referring to FIG. 5, the ball ramp operation unit 30 includes the driving motor 31, a fixed ramp 32 rotated by the driving motor 31 and sliding the shift guide 33, a movable ramp 36 slid by the rotation of the fixed ramp 32 and sliding a piston 34, a ball 35 disposed between the fixed ramp 32 and the movable ramp 36 and formed to push the movable ramp 36 by the rotation of the fixed ramp 32, the shift guide 33 slid by the fixed ramp 32, and the piston 34 for operating the multi-plate clutch 23 by the movable ramp 36.

The driving motor 31 rotates when power is applied. A driving gear unit 31a is formed on the output shaft of the driving motor 31.

The fixed ramp 32 does not move in the axial direction and rotates in place to slide the shift guide 33 or push the movable ramp 36.

A driven gear unit 32a is formed around the fixed ramp 32. The driven gear unit 32a is engaged with the driving gear unit 31a formed on the output shaft of the driving motor 31. For example, the driving gear unit 31a and the driven gear unit 32a may be composed of a worm and a worm wheel.

Here, the driven gear unit 32a is formed at only a predetermined angle in a circumferential direction of the fixed ramp 32. Accordingly, not only can the size of the fixed ramp 32 be reduced, but also the fixed ramp 32 is allowed to rotate only within a predetermined angle.

An extension 32c extends from the fixed ramp 32 toward the shift guide 33.

A finger 32d coupled to the shift guide 33 is formed at an end portion of the extension 32c. The finger 32d is formed to protrude from the end portion of the extension 32c toward a center of the shaft.

As the fixed ramp 32 rotates, the fixed ramp 32 rotates the shift guide 33 in the axial direction.

A ball accommodation groove 32b of the fixed ramp 32 is formed in one side surface of the fixed ramp 32, that is, on a surface facing the movable ramp 36. The ball accommodation groove 32b may be formed as a plurality of ball accommodation grooves at intervals in the circumferential direction of the fixed ramp 32.

The shift guide 33 is slid in the axial direction by the rotation of the fixed ramp 32. A slot 33a into which the finger 32d is inserted is formed in the shift guide 33.

The slot 33a has the following profile.

Figure 6:
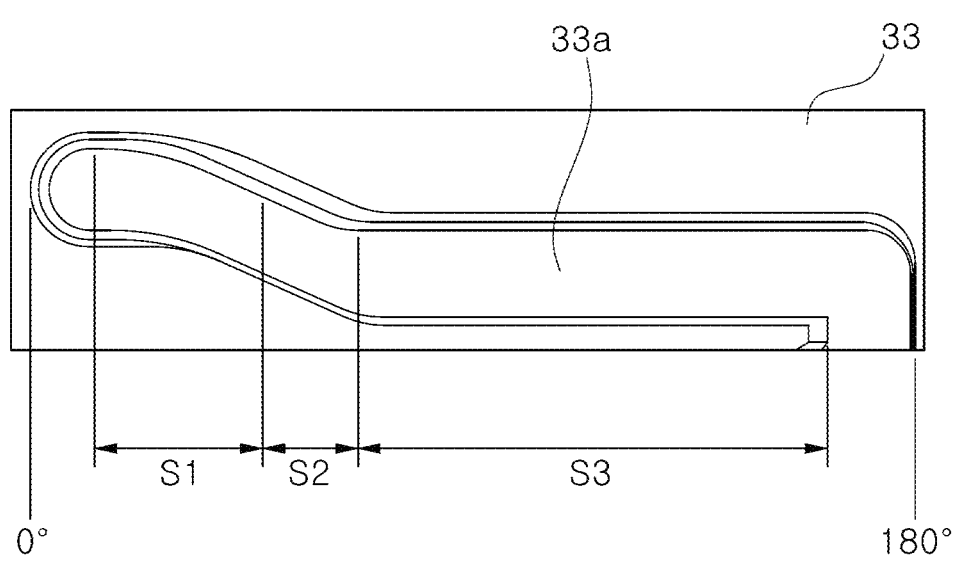
FIG. 6 is a cut perspective view illustrating main components of the electronic limited slip differential device in the built-in disconnector assembly for an electronic limited slip differential device according to the present disclosure.

Referring to FIG. 6, a first rotation section S1, which is formed at a predetermined angle in the circumferential direction of the shift guide 33 and in which the outer case 11 and the inner case 12 are fastened from a separated state, is formed. An inclined section S2 connected to the first rotation section S1 is formed. In addition, a second rotation section S3, which is connected to the inclined section S2, which is formed in the circumferential direction of the shift guide 33 to be positioned closer to the fixed ramp 32 than the first rotation section S1, and in which the multi-plate clutch is pressed, is formed.

In order for the shift guide 33 to slide the sleeve 16, the guide accommodation groove 16a is formed at a predetermined depth in the circumference of the sleeve 16, and a coupling portion 33b inserted into the guide accommodation groove 16a is formed on an inner surface of the shift guide 33. By inserting the coupling portion 33b into the guide accommodation groove 16a, the shift guide 33 and the sleeve 16 slide together in the axial direction.

The movable ramp 36 is disposed on one side surface of the fixed ramp 32, that is, a surface of the fixed ramp 32, which faces the outer case 11. When the fixed ramp 32 rotates, the movable ramp 36 is pushed by the fixed ramp 32 and slides in the axial direction.

Another ball accommodation groove 36a is formed on a surface of the movable ramp 36, which faces the fixed ramp 32.

The ball 35 is inserted into the ball accommodation grooves 32b and 36s formed in the fixed ramp 32 and the movable ramp 36, respectively. When the ball 35 is accommodated in both the ball accommodation groove 32b formed in the fixed ramp 32 and the ball accommodation groove 36a formed in the movable ramp 36, the fixed ramp 32 and the movable ramp 36 are disposed adjacent to each other. However, when the ball 35 is disengaged from the ball accommodation groove 32b formed in the fixed ramp 32 or the ball accommodation groove 36a formed in the movable ramp 36 by the rotation of the fixed ramp 32, the ball 35 and the movable ramp 36 are disengaged as much as displacement by which the ball 35 is disengaged.

At least one of the ball accommodation groove 32b formed in the fixed ramp 32 and the ball accommodation groove 36a formed in the movable ramp 36 may be formed at a predetermined angle in the circumferential direction of the fixed ramp 32 or the movable ramp 36. It is because the fixed ramp 32 rotates at a predetermined angle, and then the movable ramp 36 needs to be separated from the fixed ramp 32. That is, while the finger 32d is in the first rotation section S1 and the inclined section S2, even if the fixed ramp 32 rotates, the fixed ramp 32 and the movable ramp 36 should not be separated.

The piston 34 is disposed in contact with the movable ramp 36. One end of the piston 34 is disposed in contact with the movable ramp 36, and the other end is disposed at a predetermined interval from the multi-plate clutch 23.

When the movable ramp 36 is pushed and slid by the rotation of the fixed ramp 32, the other end of the piston 34 presses the multi-plate clutch 23 so that the multi-plate clutch 23 is operated. While the finger 32d rotates, the fixed ramp 32 pushes the movable ramp 36 so that the piston 34 presses the multi-plate clutch 23.

The operation of the built-in disconnector assembly for an eLSD device according to the present disclosure having the above configuration will be described as follows.

Figure 8A:
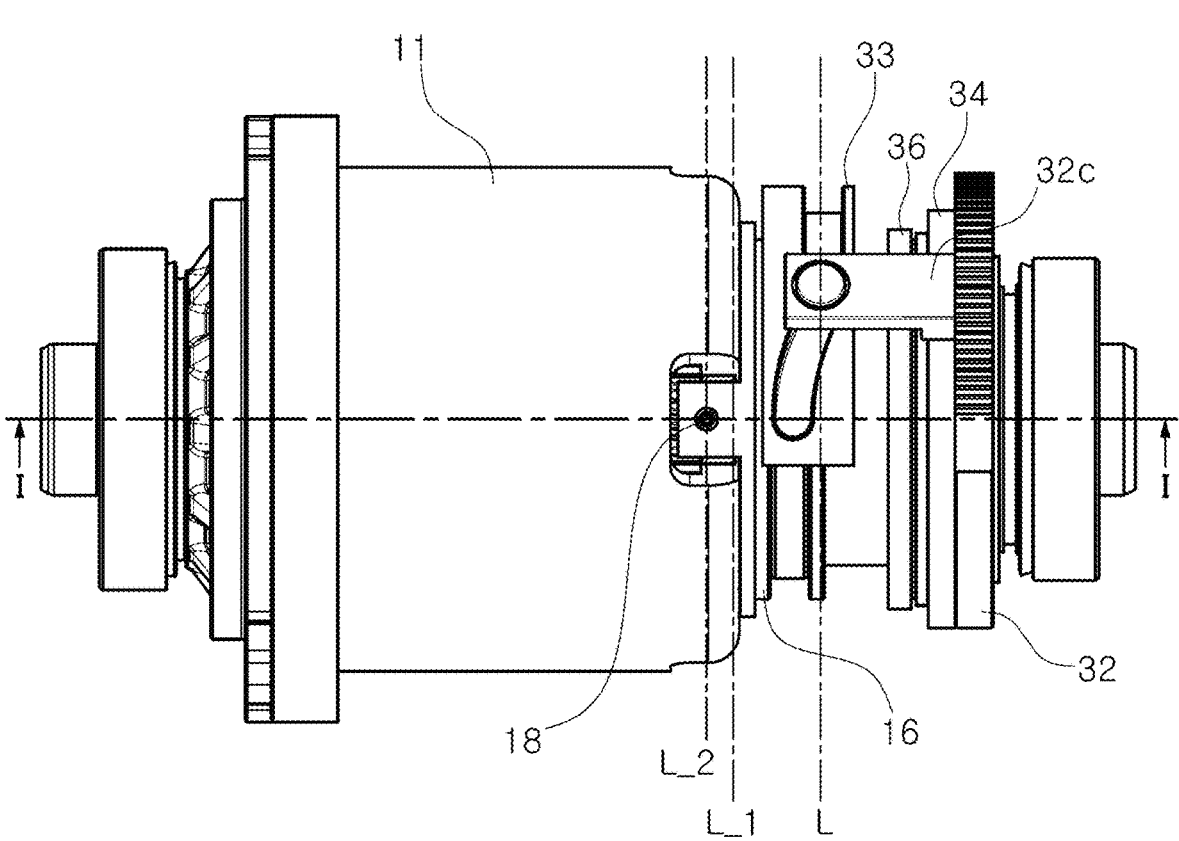
FIG. 8A is a side view illustrating a state in which the disconnector device is fastened and the electronic limited slip differential device is not fastened in the built-in disconnector assembly for an electronic limited slip differential device according to the present disclosure.
Figure 9A:
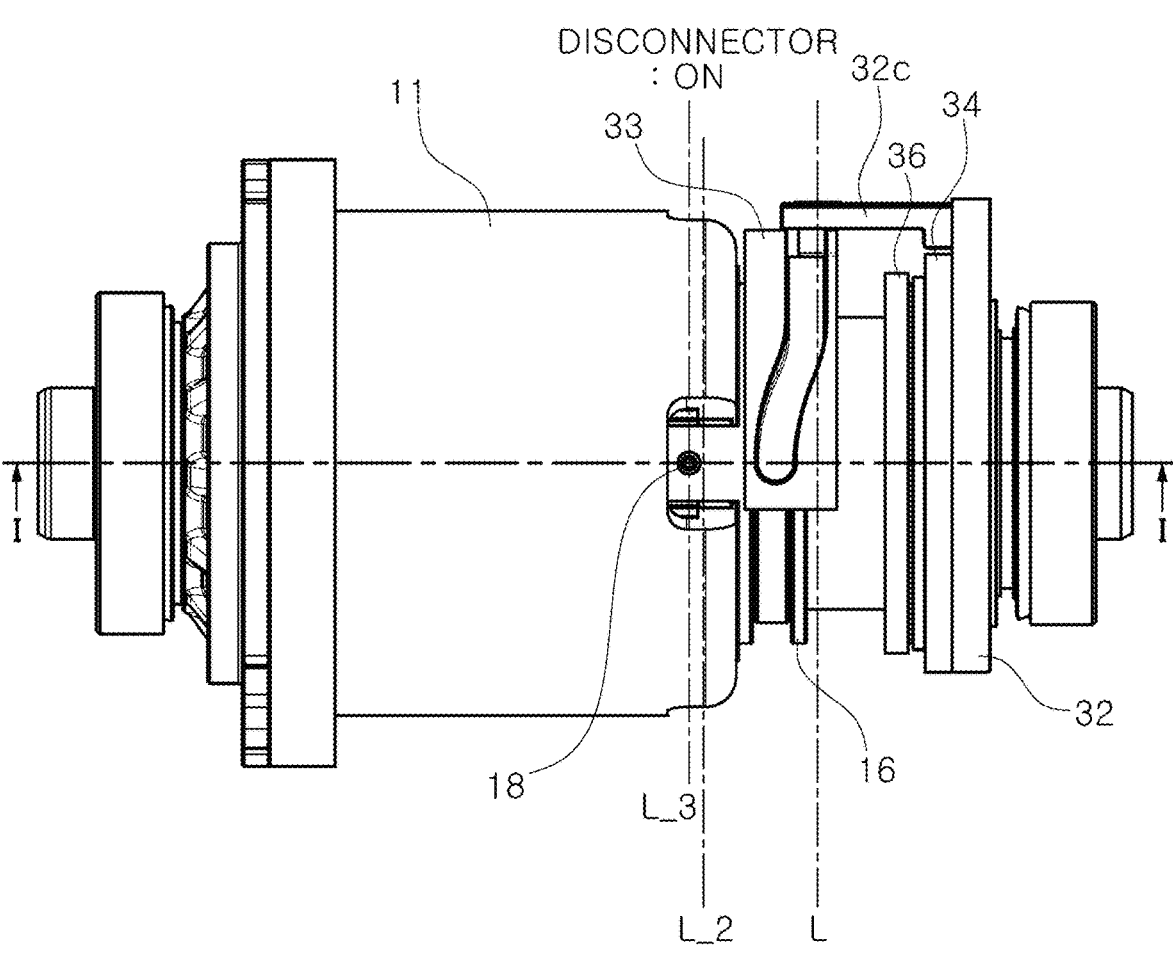
FIG. 9A is a side view illustrating a state in which both the disconnector device and the electronic limited slip differential device are fastened in the built-in disconnector assembly for an electronic limited slip differential device according to the present disclosure.

In FIGS. 7A, 8A, and 9A, a position of the finger 32d is denoted as L, and a position of the coupling pin 18 fastening the sleeve 16 and the clutch ring 17 is denoted as L_1, L_2, or L_3.

FIGS. 7A and 7B illustrate that the disconnector device 10 and the eLSD device 20 are each in a non-fastened state.

Since the disconnector device 10 is in a non-fastened state, the clutch ring 17 and the inner case 12 are not engaged. Since the eLSD device 20 is also in a non-fastened state, the piston 34 does not press the multi-plate clutch 23.

When the disconnector device 10 and the eLSD device 20 are each in a non-fastened state, the coupling pin 18 maintains an initial position L_1.

Figure 8B:
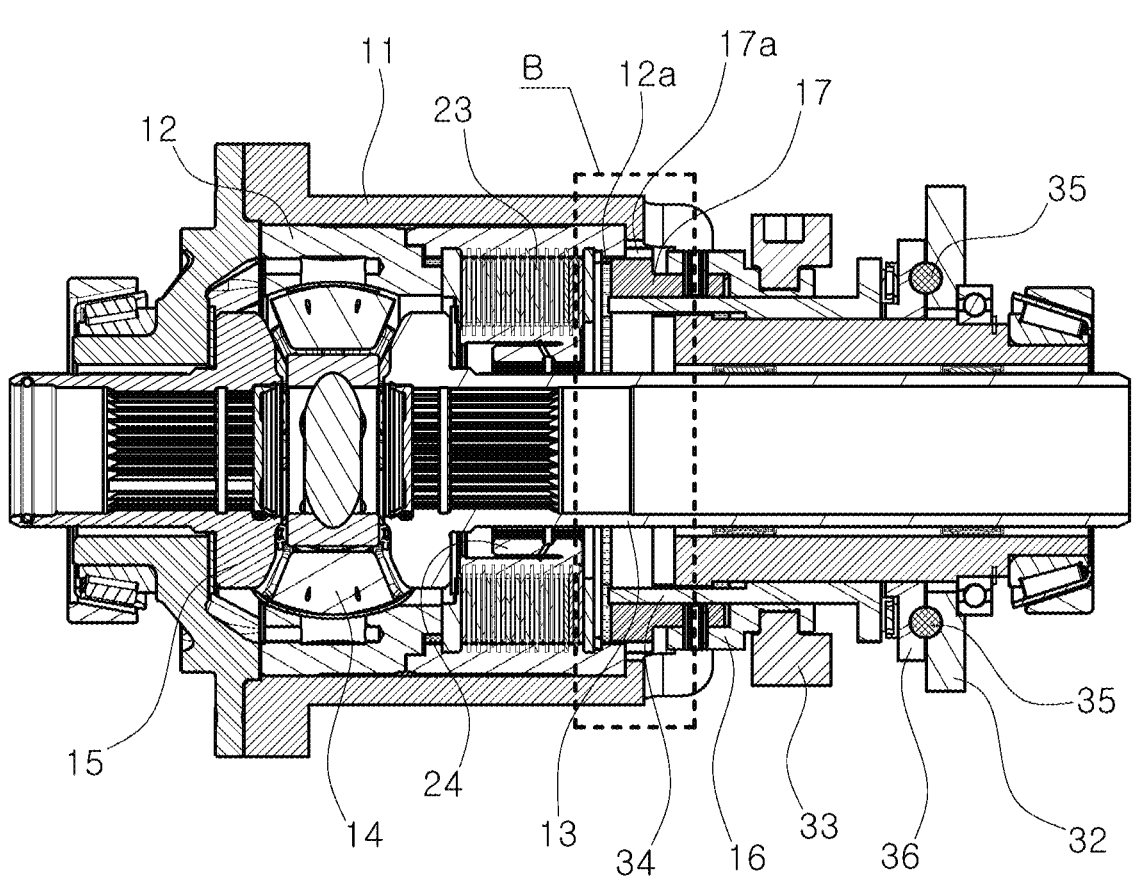
FIG. 8B is a cross-sectional view illustrating the state in which the disconnector device is fastened and the electronic limited slip differential device is not fastened in the built-in disconnector assembly for an electronic limited slip differential device according to the present disclosure.
Figure 8C:
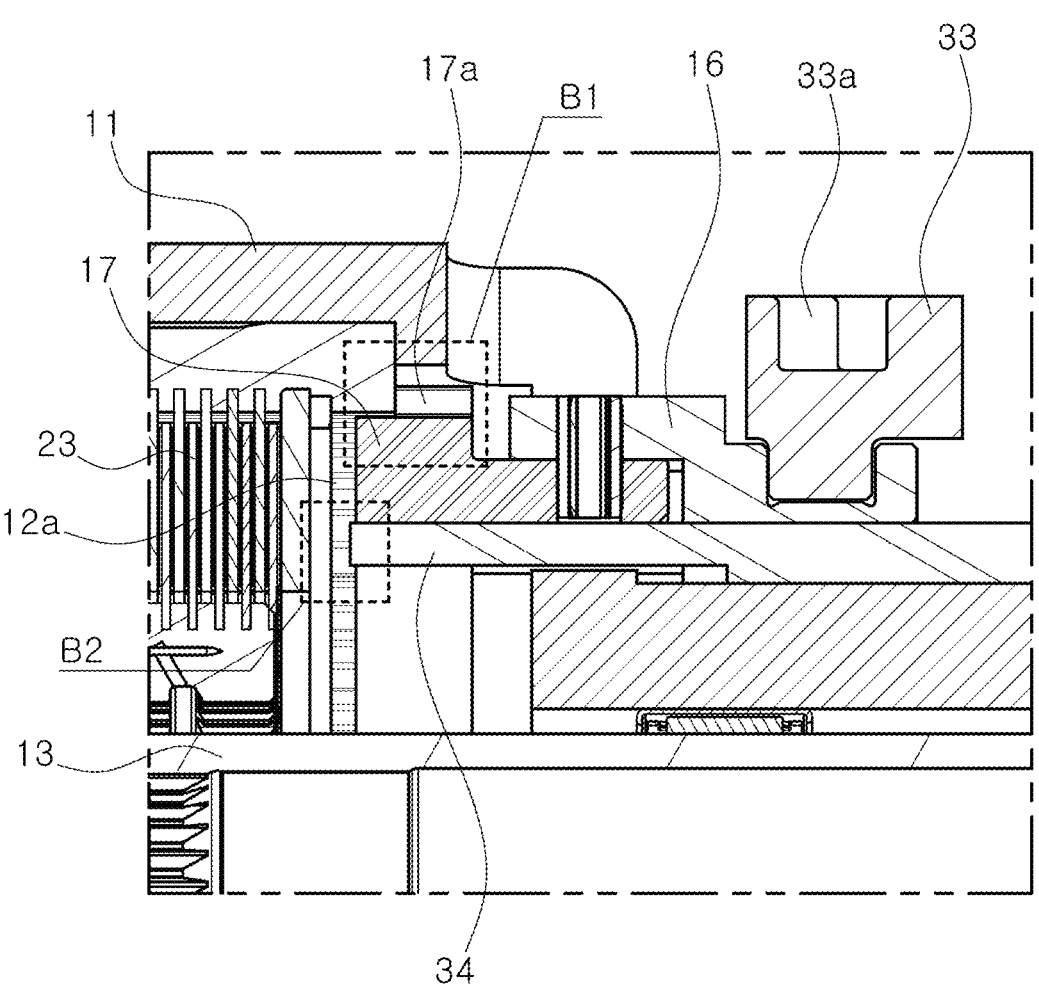
FIG. 8C is an enlarged view of main components of FIG. 8B.

FIGS. 8A and 8B illustrate that the disconnector device 10 is fastened and the eLSD device 20 is not fastened.

When the driving motor 31 operates in a state in which both the disconnector device 10 and the eLSD device 20 are not fastened, the fixed ramp 32 starts to rotate.

When the fixed ramp 32 rotates, the finger 32d moves the first rotation section S1 and then passes the inclined section S2. While the finger 32d moves the first rotation section S1, the shift guide 33 maintains the initial position L_1. However, when the finger 32d passes the first rotation section S1 and enters the inclined section S2, the shift guide 33 slides in a direction away from the fixed ramp 32 (from left to right in the drawing).

In this way, when the shift guide 33 moves in a direction away from the fixed ramp 32, the sleeve 16 and the clutch ring 17 also move along with the shift guide 33. That is, the coupling pin 18 moves from L_1 to L_2. Accordingly, as the sleeve 16 moves in a direction away from the fixed ramp 32, the sleeve 16 is engaged with the inner case 12. That is, the first spline 12a and the second spline 17a are engaged by the movement of the sleeve 16. Accordingly, since the sleeve 16 rotates integrally with the outer case 11, when the first spline 12a and the second spline 17a are engaged, the outer case 11 and the inner case 12 are eventually fastened, and thus the disconnector device 10 is fastened.

Meanwhile, while the fixed ramp 32 rotates the first rotation section S1 and the inclined section S2 by the operation of the driving motor 31, the movable ramp 36 is not substantially separated from the fixed ramp 32.

Figure 9B:
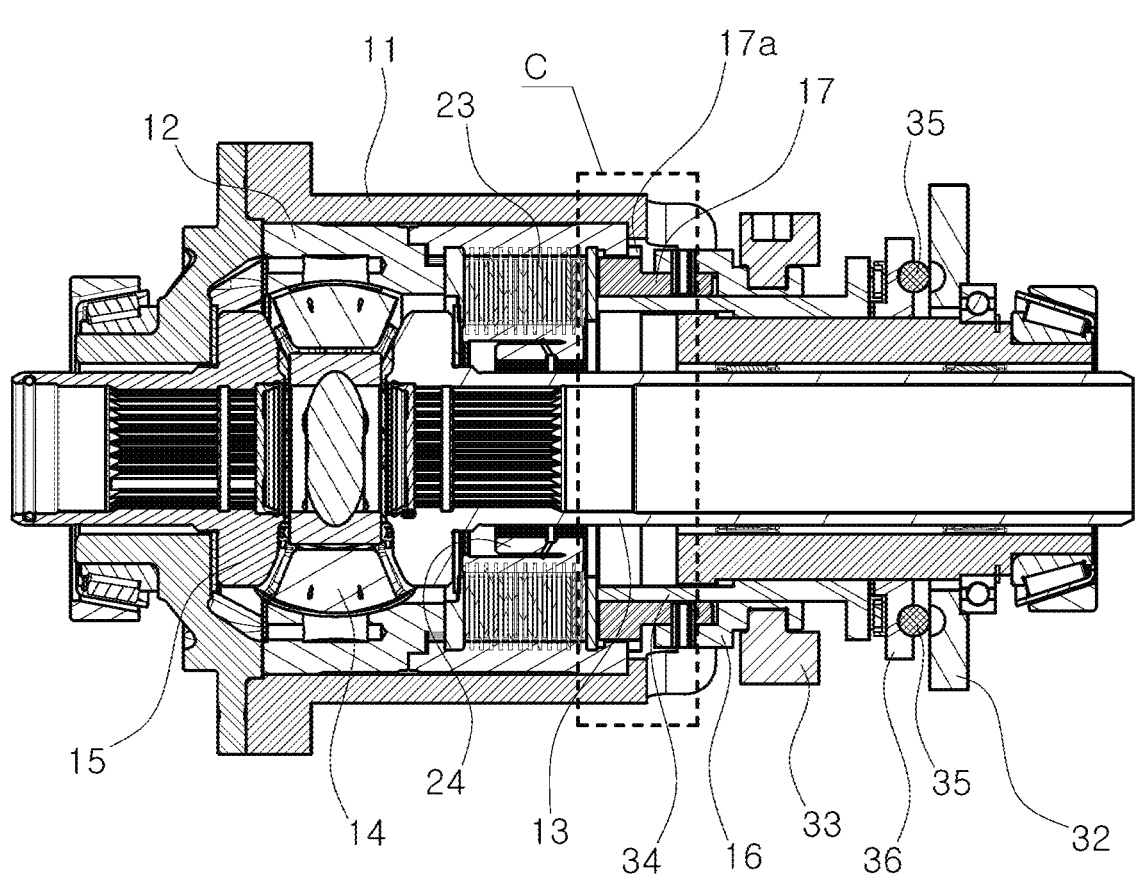
FIG. 9B is a cross-sectional view illustrating the state in which both the disconnector device and the electronic limited slip differential device are fastened in the built-in disconnector assembly for an electronic limited slip differential device according to the present disclosure.
Figure 9C:
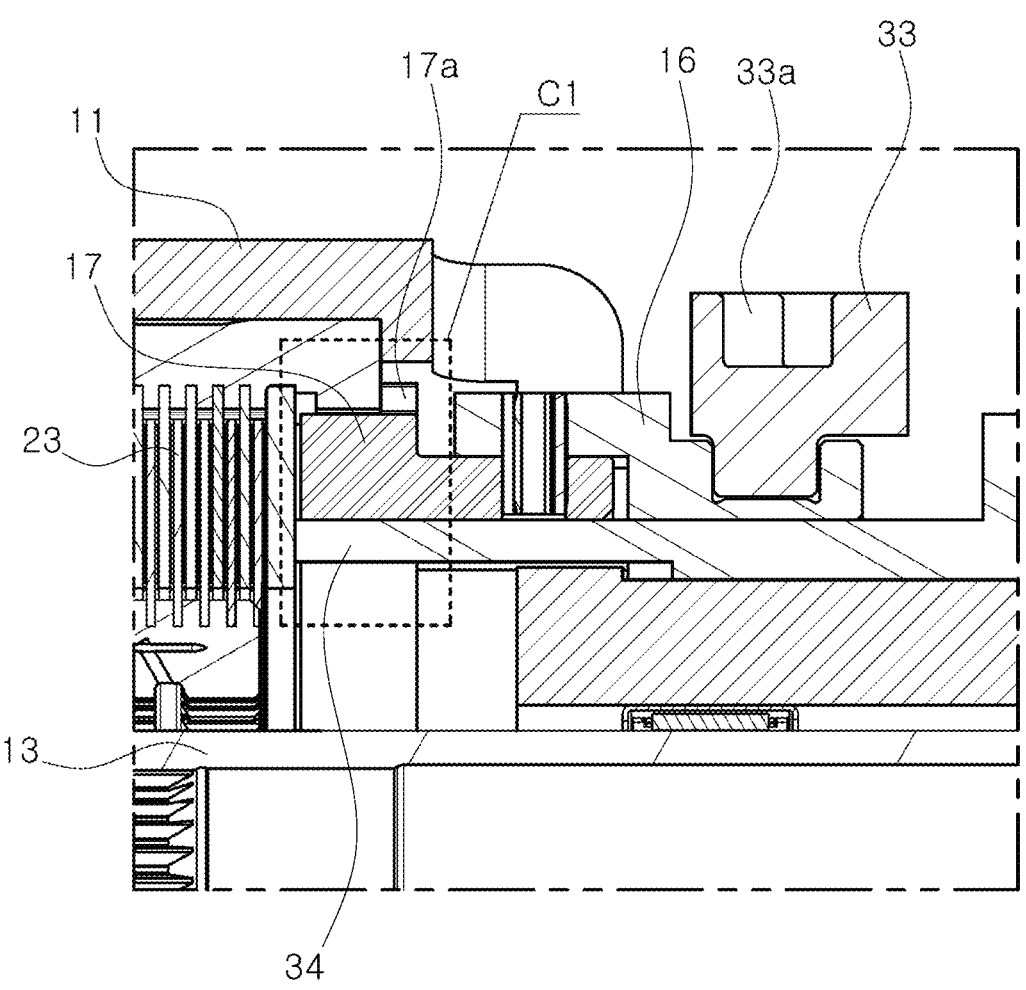
FIG. 9C is an enlarged view of main components of FIG. 9B.

FIGS. 9A to 9C illustrate fastened states of the disconnector device 10 and the eLSD device 20.

When the driving motor 31 continuously rotates from the state in which only the disconnector device 10 is fastened, the disconnector device 10 maintains the fastened state, and the eLSD device 20 also changes from the non-fastened state to the fastened state.

Since the finger 32d of the shift guide 33 has entered the second rotation section S3 from an end point of the inclined section S2, the sleeve 16 and the clutch ring 17 maintain a state of being continuously pushed toward the inner case 12, and the disconnector device 10 maintains the fastened state.

Meanwhile, as the fixed ramp 32 rotates, the ball 35 is detached from the ball accommodation groove 32b formed in the fixed ramp 32. When the ball 35 is detached from the ball accommodation groove 32b, the ball 35 slides by pushing the movable ramp 36 in a direction away from the fixed ramp 32.

In this way, when the movable ramp 36 slides in a direction away from the fixed ramp 32, the movable ramp 36 slides toward the multi-plate clutch 23 through the piston 34. When the piston 34 presses the multi-plate clutch 23, power may be transmitted through the multi-plate clutch 23, and thus the eLSD device 20 is also fastened.

In this state, the finger 32d rotates in the second rotation section S3 so that the shift guide 33 does not slide the sleeve 16, but the fixed ramp 32 pushes the movable ramp 36, and thus the coupling pin 18 moves to L_3.

To change the disconnector device 10 and the eLSD device 20 from the fastened state to the non-fastened state, the driving motor 31 rotates in the opposite direction.

When the driving motor 31 rotates in the opposite direction, the corresponding process proceeds reversely to the above-described process, and thus the eLSD device 20 first changes from the fastened state to the non-fastened state, and then the disconnector device 10 also enters the non-fastened state.

While the present disclosure has been described with reference to the accompanying drawings, it will be apparent to those skilled in the art that various changes and modifications can be made without departing from the spirit and scope of the present disclosure without being limited to the exemplary embodiments disclosed herein. Accordingly, it should be noted that such alternations or modifications fall within the claims of the present disclosure, and the scope of the present disclosure should be construed on the basis of the appended claims.

The invention claimed is:

1. A built-in disconnector assembly for an electronic limited slip differential (eLSD) device, comprising:
a shift guide configured to slide so that an outer case and an inner case of a disconnector device are fastened;
a piston configured to press a multi-plate clutch so that the multi-plate clutch enters an operation state; and
a ball ramp operation unit configured to be rotated by a driving motor, and configured to slide the shift guide and the piston toward the disconnector device;
wherein the ball ramp operation unit is configured to slide the shift guide to fasten the disconnector device, and to rotate at a predetermined angle to slide the piston so that the eLSD device enters a fastened state,
wherein the built-in disconnector assembly further comprises:

a sleeve configured to be slid by the shift guide; and a clutch ring formed integrally with the sleeve, wherein a spline is formed along a circumference of the clutch ring, and wherein the clutch ring is configured to rotate integrally with the outer case;

wherein, when the sleeve and the clutch ring move toward the inner case, the outer case and the inner case are fastened.

2. The built-in disconnector assembly of claim 1, wherein the inner case comprises a second spline engaged with the spline of the clutch ring, and wherein the clutch ring is engaged with the inner case so that the inner case and the outer case are engaged.

3. The built-in disconnector assembly of claim 1, wherein:

a guide accommodation groove is formed at a predetermined depth along a circumference of the sleeve; and an inner surface of the shift guide includes a coupling portion inserted into the guide accommodation groove.

4. The built-in disconnector assembly of claim 1, wherein the ball ramp operation unit includes:

the driving motor;

a fixed ramp configured to be rotated by the driving motor to slide the shift guide;

a movable ramp configured to slide by rotation of the fixed ramp, and configured to slide the piston; and a ball positioned between the fixed ramp and the movable ramp, and configured to push the movable ramp by rotation of the fixed ramp.

5. The built-in disconnector assembly of claim 4, wherein a slot having a predetermined profile is formed along a circumference of the shift guide.

6. The built-in disconnector assembly of claim 5, wherein the predetermined profile of the slot of the shift guide includes:

a first rotation section formed at a predetermined angle in a circumferential direction of the shift guide, and configured to fasten the outer case and the inner case;

an inclined section connected to the first rotation section; and a second rotation section connected to the inclined section, formed in the circumferential direction of the shift guide and positioned closer to the fixed ramp than the first rotation section, and into which the multi-plate clutch is pressed.

7. The built-in disconnector assembly of claim 6, wherein, when a finger of the fixed ramp rotates in the second rotation section, the fixed ramp pushes the movable ramp to press the multi-plate clutch.

8. The built-in disconnector assembly of claim 5, wherein the fixed ramp incudes;

an extension extending toward the shift guide; and a finger formed on an end portion of the extension and configured to be inserted into the slot.

9. The built-in disconnector assembly of claim 4, wherein:

a driven gear unit is formed at a predetermined angle in a circumferential direction of the fixed ramp on a circumference of the fixed ramp; and the driven gear unit is engaged with a driving gear unit positioned on an output shaft of the driving motor.

10. The built-in disconnector assembly of claim 4, wherein:

a surface of the fixed ramp includes a first ball accommodation groove configured to accommodate the ball, which faces the movable ramp, along a circumference of the fixed ramp; and a surface of the movable ramp includes a second ball accommodation groove configured to accommodate the ball, which faces the fixed ramp, along a circumference of the movable ramp.

11. The built-in disconnector assembly of claim 10, wherein, when the fixed ramp rotates and the ball is detached from one of the first or second ball accommodation groove, the movable ramp is pushed toward the multi-plate clutch so that the piston presses into the multi-plate clutch.

12. The built-in disconnector assembly of claim 1, wherein:

a first connection portion protruding toward the clutch ring is formed on the sleeve along a circumference of the sleeve;

a second connection portion protruding toward the sleeve is formed on the clutch ring along a circumference of the clutch ring; and the first connection portion and the second connection portion are fastened together.

13. The built-in disconnector assembly of claim 12, wherein the outer case comprises a through hole through which the first connection portion and the second connection portion are fastened after passing, and the outer case is configured to rotate integrally with the sleeve and the clutch ring.

14. An electronic limited slip differential (eLSD) device comprising:

a disconnector device having a built-in disconnector assembly, the built-in connector assembly comprising:

a shift guide configured to fasten an outer case of the disconnector device to an inner case of the disconnector device;

a piston configured to operate a multi-plate clutch;

a ball ramp operation unit including a driving motor configured to rotate the ball ramp operation unit, wherein the ball ramp operation unit is configured to slide the shift guide and the piston toward the disconnector device;

wherein the ball ramp operation unit is configured to slide the shift guide to fasten the disconnector device, and to rotate at a predetermined angle to slide the piston to fasten the eLSD device; and wherein the built-in disconnector assembly further comprises:

a sleeve configured to be operated by the shift guide; and a clutch ring formed integrally with the sleeve, wherein a spline is formed along a circumference of the clutch ring, and wherein the clutch ring is configured to rotate integrally with the outer case;

wherein, when the sleeve and the clutch ring move toward the inner case, the outer case and the inner case are fastened.

15. The electronic limited slip differential (eLSD) device of claim 14, wherein the ball ramp operation unit further includes:

a fixed ramp configured to be rotated by the driving motor to operate the shift guide;

a movable ramp configured to slide by rotation of the fixed ramp, and configured to operate the piston; and a ball positioned between the fixed ramp and the movable ramp, wherein the ball is configured to push the movable ramp by rotation of the fixed ramp.

16. The electronic limited slip differential (eLSD) device of claim 15, wherein a slot is formed along a circumference of the shift guide.

17. The electronic limited slip differential (eLSD) device of claim 16, wherein the slot of the shift guide includes:

a first rotation section formed at a predetermined angle in a circumferential direction of the shift guide, and configured to fasten the outer case to the inner case;

an inclined section connected to the first rotation section; and a second rotation section connected to the inclined section and formed in the circumferential direction of the shift guide, wherein the second rotation section is positioned closer to the fixed ramp than the first rotation section, and into which the multi-plate clutch is pressed.

18. The electronic limited slip differential (eLSD) device of claim 15, wherein:

a surface of the fixed ramp includes a first ball accommodation groove configured to accommodate the ball, which faces the movable ramp, along a circumference of the fixed ramp; and a surface of the movable ramp includes a second ball accommodation groove configured to accommodate the ball, which faces the fixed ramp, along a circumference of the movable ramp.

\* \* \* \* \*